United States Patent

Lietha et al.

[11] Patent Number: 5,983,096
[45] Date of Patent: Nov. 9, 1999

[54] COMMUNICATIONS SYSTEM WITH MOBILE TELEPHONES AND OPERATING METHOD

[75] Inventors: Peter Lietha, Fischbach; Eugen Rippstein, Aesch, both of Switzerland

[73] Assignee: Siemens Schweiz AG, Zurich, Switzerland

[21] Appl. No.: 08/647,979

[22] PCT Filed: Dec. 1, 1995

[86] PCT No.: PCT/CH95/00284

§ 371 Date: Jun. 3, 1996

§ 102(e) Date: Jun. 3, 1996

[87] PCT Pub. No.: WO96/18274

PCT Pub. Date: Jun. 13, 1996

[30] Foreign Application Priority Data

Dec. 5, 1994 [CH] Switzerland ............................ 03678/94

[51] Int. Cl.⁶ ........................................................ H04Q 7/22
[52] U.S. Cl. ........................... 455/416; 455/414; 455/560
[58] Field of Search .................................. 455/422, 414,
455/417, 418, 561, 445, 403, 416, 560;
379/201, 202, 205, 156, 157, 158; 370/328,
338, 522, 524

[56] References Cited

FOREIGN PATENT DOCUMENTS

| 0569061 | 11/1993 | European Pat. Off. . |
| 681409 | 3/1993 | Switzerland . |
| 90/12469 | 10/1990 | WIPO . |
| 92/17013 | 10/1992 | WIPO . |

OTHER PUBLICATIONS

P.R. Gerke, Digitale Kommunikationsnetz, Springer–Verlag, Heidelberg, pp. 4, 5; Table 7.5; and Chapter 6.7 (1991).
Kambach and Körber, ISDN die Technik, Hüthig Verlag, Heidelberg 1990, p. 34, Chapter 5.1, chapter 7, pp. 265–266 (1990).
P. Bocker, ISDN das diensteintegrierende digitale Nachrichtennetz, Springer–Verlag, Heidelberg 1990, Chapter 4.3.5.1; chapter 4.3.5.5 (1990).

Primary Examiner—Dwayne D. Bost
Assistant Examiner—Jean A. Gelin
Attorney, Agent, or Firm—Greenblum & Bernstein, P.L.C.

[57] ABSTRACT

The communications system has an ISDN central switching station (VSTa), to which at least one special-purpose terminal device (SE) provided with electroacoustical transducers (MIC, LS) is connected and with which a mobile set (MT) is associated. The special-purpose terminal devices (SE1, ..., SEn) are provided with a processor (MP) and a switching unit (SWUe), by means of which a connection between a terminal device (EGx) and the mobile substation (MT1; MT2; ...) associated with the special terminal (SE1; SE2; ...) can be switched through. To set up a call from the mobile set (MT1; MT2; ...) via the switching unit (SWUe) to the terminal device (EGx), target addresses of the terminal device (EGx) are transferred to the special-purpose terminal device (SE1; SE2; ...), so that the special-purpose terminal device (SE1; SE2; ...) is suitable for extracting this information and switching the connection through. Means for speech monitoring and/or recording the switched-through telephone call are also provided in the special-purpose terminal device (SE1; SE2; ...). All the calls carried by the mobile set (MT) can therefore be listened in on at the workstation of the person carrying the mobile set. Conference calls can also be switched, or functions (call recording, alarm, etc.) can be tripped by remote control from the mobile set (MT1; MT2; ...) to the special-purpose terminal device (SE1; SE2; ...).

12 Claims, 2 Drawing Sheets

COMMUNICATIONS SYSTEM WITH MOBILE TELEPHONES AND OPERATING METHOD

CROSS REFERENCE TO RELATED APPLICATION

The present application claims priority under 35 U.S.C. § 119 of Swiss Patent Application No. 03 678/94-1, filed Dec. 5, 1994.

BACKGROUND OF THE INVENTION

1. Field of the Invention

The present invention is directed to a communications system having an ISDN central switching station coupled, via a server module, to at least one special terminal with an electroacoustical transducer, and having at least one mobile set for establishing connections to the central switching station via base stations and associated server modules. The present invention is also directed to a method for operating a communications system having an ISDN central switching station coupled, via a server module, to at least one special terminal with an electroacoustical transducer, and having at least one mobile set for establishing connections to the central switching station via base stations and associated server modules.

2. Discussion of Background Information

The cordless telephone systems of today allow the user to conduct his conversions independently of his workstation. Systems with a base station that is fixedly assigned to a mobile set, for instance via a secret code number, normally have a range of from 30 m in buildings to 300 m in the open. Other systems have base stations arranged in various service zones, and a mobile set automatically enters into communication with a base station as soon as it enters its range. The display of relevant information, such as the called number, stored numbers, charges incurred, battery status, etc., normally takes place on the mobile sets. Based on this concept, base stations can be mounted separately, outside the site and reach of the user. From International Application WO-A 90/12469, a cordless telephone system is known in which there are fewer fixed stations than mobile sets. By way of the service features of call rerouting and call rerouting tailing, made available via the private automatic branch exchange (PABX), the change of a mobile set to the radio region of a different fixed station is updated. The base stations described in European Patent Application EP-A 0 569 061 can also be provided with various identification codes, so that a plurality of mobile sets can get in contact with one base station, or individual mobile sets can contact various base stations. For the user and his work environment, it does not matter which base station the call is routed through. Communications take place solely between the bearer of the mobile set and another user. Third parties neither gain access to call-specific data nor are capable of listening in on the speech signals transmitted or entering into a conference call. This is particularly disadvantageous if the mobile set bearer is a member of a work team within which fast, problem-free data exchange is important.

SUMMARY OF THE INVENTION

It is therefore the object of the present invention to create a communications system with mobile telephones or mobile sets with which at least one terminal device, for instance, provided at a workstation, is associated and by way of which other authorized parties can access data and/or speech signals of a conversation being carried out by the bearer of the mobile set and a further user. A corresponding operating method is also to be disclosed.

The communications system of the invention allows wireless coupling of the mobile set to base stations of public or private telephone networks. As a result, a maximum range for cordless communications is achieved. The user at the workstation can contact a further user either via the stationary terminal device or via the mobile set. The channels used by the mobile set bearer are extended in both directions beyond the stationary terminal device, so that via the stationary terminal device access to all essential data of the connection dialed by the mobile set, for instance, is possible. Especially advantageously, the embodiment of the invention can be used in a communications system as described in International Patent Application WO-A 92/17013.

Accordingly, the present invention may be directed to a communications system that includes an ISDN central switching station, at least one special terminal device, with electroacoustical transducers, being coupled to the ISDN central switching station via a server module, at least one base connection, and at least one mobile set adapted for connection to the central switching station via the at least one base station and associated base server modules. The at least one special terminal device may be associated with the at least one mobile set, and one of the special terminal device and the server module may include a processor and a switching unit. The processor and the switching unit may form a switchable connection between a terminal device and the at least one mobile set may be associated with the at least one special terminal device. A call setup may be enabled from the at least one mobile set to the terminal device via the switching unit by at least one of:

(a) the at least one special terminal device being adapted for connection to a switching center extension of the central switching station, and a target address of the at least one special terminal device for choosing a route, a target address of the terminal device for a target choice, and an identifier of the at least one mobile set are adapted to be written into a "target address" field of a SETUP message;

(b) the at least one special terminal device being adapted for connection to a user extension of the central switching station, and the at least one mobile set being adapted for inputting a target address of the terminal device into a "user-to-user information" field of a SETUP message, and the at least one special terminal device being adapted for extracting the target address and providing a switchable connection to the target address; and (c) the at least one special terminal device being adapted for connection to a user extension of the central switching station, and the at least one mobile set being adapted for inputting a target address of the terminal device into an ISDN message element "called user number", and the at least one special terminal device being adapted for extracting the target address and providing a switchable connection to the target address; and (d) the at least one special terminal device being adapted for connection to a user extension of the central switching station, and the at least one mobile set being adapted for inputting a target address of the terminal device via a speech channel, and the at least one special terminal device being adapted for extracting the target address of the terminal device and providing a switchable connection to the target address.

In accordance with another feature of the present invention, the at least one special terminal device may include at least one of a speech monitoring device and a telephone call recording device for the switched connections.

In accordance with still another feature of the present invention, a conference component may be provided in one of the at least one special terminal device and in the server module, and the conference component may be adapted to establish a conference call between the at least one mobile set, the special terminal device, and the terminal device.

In accordance with still another feature of the present invention, the processor may be adapted for evaluating at least one of the "user-to-user information" and the "source address" of the corresponding fields of the SETUP message and for carrying out any instructions contained therein.

In accordance with a further feature of the present invention, a call arriving from the terminal device is indicated on the at least one special terminal device and substantially concurrently switchably connected to the at least one mobile set.

In accordance with a still further feature of the present invention, a call arriving from the terminal device is indicated on the at least special terminal device and, if the call is not terminated to the at least one special terminal device within a delay period, the at least one special terminal device switchably connects the call to the at least one mobile set.

In accordance with another feature of the present invention, the at least one special terminal device further with an actuating device and an optical display device. The communications system further includes control procedures that control the actuating device and optical display device and that transfer data in a transfer procedure from the at least one special terminal device and from the server module to a system manager through a system manager server module, switching procedures that convert transfer formats of special-purpose information data of the at least one special terminal device into communications-specific formats and that perform basic functions of switching technology, and data bank procedures that provide information about the at least one special terminal device and the server module to other server modules via data routes.

The present invention is also directed to a method for operating a communications system to set up calls from a mobile set to an arbitrary terminal device. The communication system including an ISDN central switching station, at least one special terminal device, with electroacoustical transducers, being coupled to the ISDN central switching station via a server module, at least one base connection, and at least one mobile set adapted for connection to the central switching station via the at least one base station and associated base server modules. The process for setting up calls from the mobile set to the arbitrary terminal device includes one of (a) connecting the at least one special terminal device to a switching center extension of the central switching station, writing target addresses of the at least one special terminal device for selecting a route and of the arbitrary terminal device for a target choice and the mobile set into a "target address" field of a SETUP message, and switching, at the at least one special terminal device, the call arriving from the mobile set to the terminal device via a switching unit;

(b) connecting the at least one special terminal device to a user terminal of the central switching station, writing a target address of the terminal device in the mobile set into "user-to-user information" field of a SETUP message, extracting the target address with the at least one special terminal device, and switching the call to the terminal device; and (c) connecting the at least one special terminal device to a user terminal of the central switching station, forwarding a target address of the terminal device in the mobile set to the at least one special terminal device via a speech channel, and forwarding the call to the terminal device.

In accordance with another feature of the present invention, the method includes selectively monitoring the forwarded call in the at least one special terminal device and supplying one of speech and data signals of the forwarded call to at least one of the electroacoustical transducer and a recording device.

In accordance with still another feature of the present invention, the method including forming a conference call between the mobile set, the at least one special terminal device, and the arbitrary terminal device.

In accordance with yet another feature of the present invention, the method including forwarding instructions carried out by the processor to the at least one special terminal device over one of a speech channel and a corresponding field of the SETUP message.

Other advantageous embodiments and features of the present invention may be ascertained by reviewing the following detailed description of the present invention and the accompanying figures.

BRIEF DESCRIPTION OF THE DRAWINGS

The invention will be described in further detail by way of example below, in conjunction with a drawing. Shown are.

DETAILED DESCRIPTION OF THE PRESENT INVENTION

Figure 1:
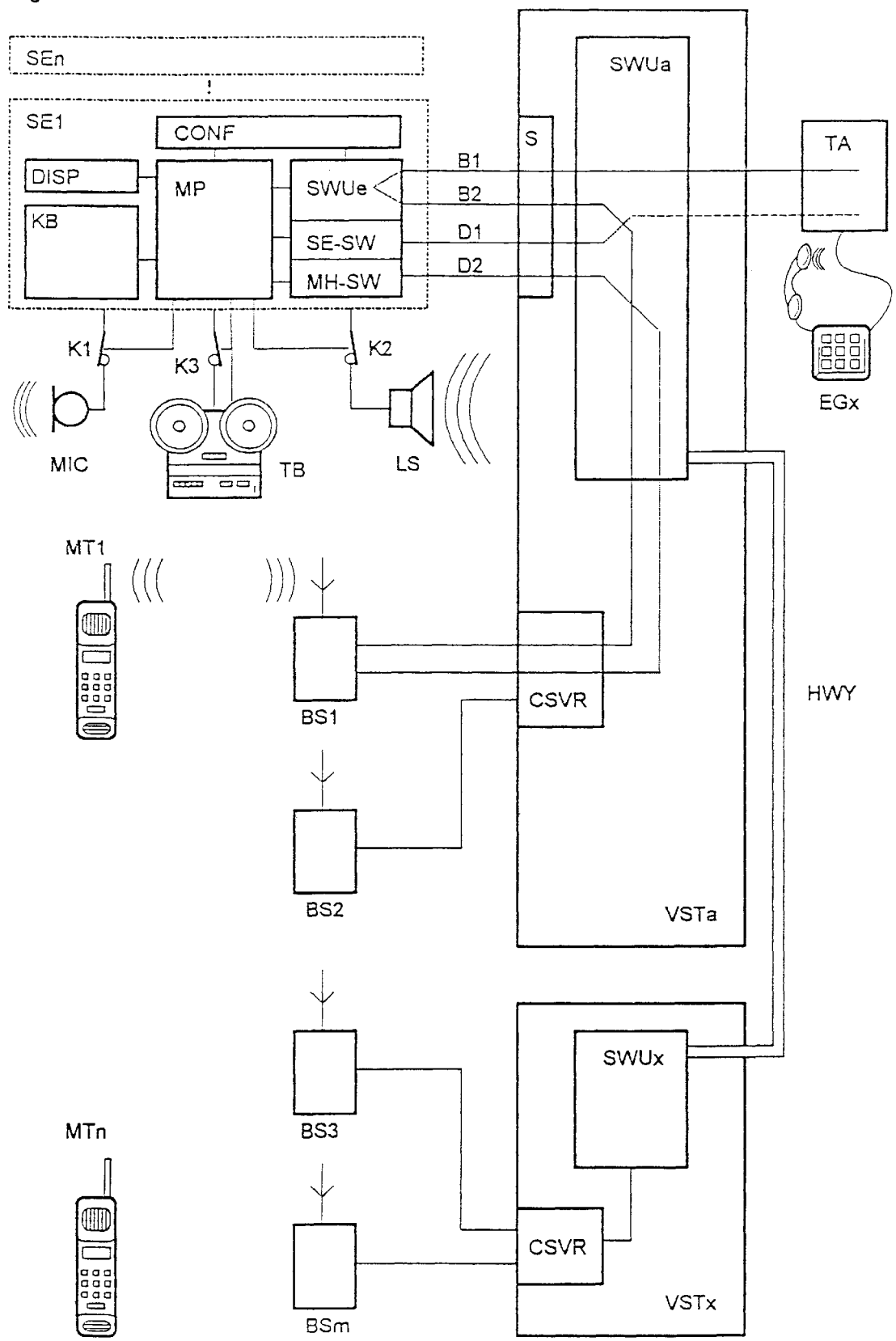
FIG. 1, a communications system according to the invention.

FIG. 1 shows a central switching station VSTa, provided with a switching unit SWUa, to which stationary terminal devices or special-purpose terminal devices SE1, ..., SE*n* are connected, for instance over glass fibers and an interface or server S. Preferably each of these special-purpose terminal devices SE1, ..., SE*n* is provided with a mobile terminal device or mobile set MT1; ...; MT*n*. These mobile sets MT1, ..., MT*n* can get in contact with arbitrary terminal devices, for instance with a terminal device EGx connected to the central switching station VSTa via a terminal adapter TA, by way of radio stations or base stations BS1, ..., BS*m*, which are connected to associated central switching stations VSTa, ..., VSTx via suitable server modules CSVR. The central switching stations VSTa, ..., VSTx are for instance connected directly with one another (via a speech highway HWY) or via the public network or a private network. The coupling of the mobile sets MT1, ..., MT*n* to the base stations BS1, ..., BS*m* and any necessary zone change are accomplished by known methods, which have been described for instance in P. R. Gerke, Digitale Kommunikationsnetz [Digital Communications Systems], Springer-Verlag, Heidelberg 1991, Chapter 6.7. See also the corresponding recommendations of the CEPT (Conférence Européenne des Administrations des Postes et Télécommunications) [European Conference on Postal and Telecommunications Administration])—GSM (Groupe Spéciale Mobile [Special Mobile Group]).

The special-purpose terminal device SE1 shown in FIG. 1, connected to the central switching station VSTa via at least one base terminal (see Kambach and Körber, ISDN die Technik [ISDN: The Technology], Hüthig Verlag, Heidelberg 1990, p. 34), is provided with a processor MP, software modules SE-SW, MH-SW, a keyboard KB, a display DISP, and all of the other essential functions of a digital terminal device. Such terminal devices are described in Kambach and Körber, ISDN die Technik [ISDN: The Technology], Hüthig Verlag, Heidelberg 1990, Chapter 7. Page 265, for instance, shows a convenience phone made with known integrated circuits. A workstation computer, of the kind shown on page 243, can preferably also be used as the terminal device. By means of the software modules SE-SW, MH-SW, the call setup to the mobile set MT1 or the special-purpose terminal device SE1 is regulated in the manner described below. The special-purpose terminal device SE1 can also be connected, via contacts K1, K2 and K3 that are actuated by the processor MP, to electroacoustical transducers (microphone MIC and loudspeaker LS) or a recording unit TB. The special-purpose terminal device SE1 also has a switching unit SWUe, by which at least the B-channels shown in FIG. 1 can be interconnected. According to the invention, the special-purpose terminal devices SE1, . . . , SEn are therefore connected as terminal devices or central switching stations to corresponding terminals of the central switching station VSTa. The choice of the terminal depends on the operating method used.

The communications system shown in FIG. 1 functions as follows. A call arriving from the terminal device EGx, for instance, is signaled in the special-purpose terminal device SE1 (the method for setting up a call between ISDN terminal devices and terminating it is described for instance in Kambach and Körber, ISDN die Technik [ISDN: The Technology], Hüthig Verlag, Heidelberg 1990, Chapter 5.1 or in P. Bocker, ISDN das diensteintegrierende digitale Nachrichtennetz [ISDN, the Integrated Services Digital Network], Springer-Verlag, Heidelberg 1990, Chapter 4.3.5.1). The processor MP of the special-purpose terminal device SE1 is programmed, for instance by the user, via the keyboard KB in such a way that the signaling or ringing tone output at the special-purpose terminal device and/or at the mobile set MT1. To that end, the signaling or ringing tone is switched through to the loudspeaker LS, and/or a call to the mobile set MT1 is set up from the special-purpose terminal device SE1 via the central switching station VSTa. To transmit speech signals from the terminal device EGx to the mobile set MT1, the speech channel (B1) of the arriving call is connected in the special-purpose terminal device SE1 with a still-available speech channel (B2) by the switching unit SWUe. It is also possible for the call to the mobile set MT1 to be set up selectively only whenever the user does not enter into the call via the special-purpose terminal device SE1 (that is, if the handset is on its cradle).

If the user wants to call the terminal device EGx, for instance, from the mobile set MT1, the connection is always made via the special-purpose terminal device SE1, which in turn connects the two B-channels with one another and which can copy the speech signals to the loudspeaker LS, for instance for purposes of listening in or for speech monitoring. Provisions for speech monitoring of telephone calls and for putting together conference calls are known to one skilled in the art from Swiss Patent CH 681 409, among other sources.

If the special-purpose terminal device SE1 is connected to a user terminal of the central switching station VSTa, then to set up the call from and to the mobile set MT1, the following method steps are contemplated, which are fundamentally shown in P. Bocker, ISDN das diensteintegrierende digitale Nachrichtennetz [ISDN, the Integrated Services Digital Network], Springer-Verlag, Heidelberg 1990, Chapter 4.3.5.1, FIG. 4.23. It can be seen from this that a terminal device making the call, after the dialing procedure, always sends a SETUP message to the network, and this message comprises the elements listed in P. R. Gerke, Digitale Kommunikationsnetz [Digital Communications Systems], Springer-Verlag, Heidelberg 1991, page 360, Table 7.5. These elements include data fields for the source address (origination address), target address (destination address) and normally also for user-user information (user-to-user information), which are not interpreted by the network (user-user signaling, see P. Bocker, ISDN das diensteintegrierende digitale Nachrichtennetz [ISDN, the Integrated Services Digital Network], Springer-Verlag, Heidelberg 1990, Chapter 4.3.5.5). The first step in call setup between the terminal device EGx and the mobile set MT1 is that first, in a known manner, a call is set up to the special-purpose terminal device SE1. For the connection onward, the special-purpose terminal device SE1 requires the destination address of the terminal device to be called. This address is known to the special-purpose terminal device SE1, if it is the mobile set MT1 that is to be called. However, if it is the terminal device EGx that is to be called, then its destination address is written into the SETUP message in the mobile set MT1 as user-user information. If there is no possibility for entering user-user information, then the ISDN interface also allows inserting a called-user number (ISDN message element that includes the number of the user calls). Instead of tripping the control functionally via ISDN protocols, control routines can also be tripped by means of stimulus terminal devices in the central switching station.

It is also possible to transmit the destination information by means of the multifrequency process (see P. R. Gerke, Digitale Kommunikationsnetz [Digital Communications Systems], Springer-Verlag, Heidelberg 1991, page 5) over the speech channel. The processor MP provided in the special-purpose terminal devices SE1 ascertains, for instance from the origination address, that a call from the mobile set has arrived. The signals arriving over the speech channel are then checked; these signals might contain not only instructions for switching onward but also the telephone number of a terminal device EGx. The destination address field of the SETUP message continues to be reserved for the destination address of the special-purpose terminal device SE1.

In the SETUP message assembled by the special-purpose terminal device SE1, the telephone number of the terminal device EGx, transmitted as user-user information or by the multifrequency method (MFV) is entered into the destination address field, so that in a known manner a connection with the terminal device EGx can be made. The special-purpose terminal device SE1 is at that moment therefore connected to both the calling and the called terminal device EGx, MT1. Information exchange is enabled for the terminal devices EGx and MT1 by the connection of the speech channels B1, B2 associated with these connections. In principle, accordingly first a connection from the calling terminal device to the special-purpose terminal device SE1 and subsequently a connection from the special-purpose terminal device SE1 to the called terminal device is made. To allow display of the origination address of the calling terminal device EGx in the mobile set MT1, this address must be taken from the arriving SETUP message in the special-purpose terminal device SE1 and transfer it to the outgoing SETUP message. In principle, the special purpose terminal device SE1 can also take over the arriving SETUP message and write into it the destination address of the mobile set MT1 or of the terminal device EGx.

Instead of indicating a destination address for a terminal device EGx, it is naturally also possible that the mobile set MT1 will request only a connection as far as the special-purpose terminal device SE1. This can be done for instance by a message in the user-user information field. For the sake of simplicity, however, the user-user information field is left empty, from which the special-purpose terminal device SE1 can infer that no connection onward is desired.

The destination addresses or telephone numbers of the special-purpose terminal device SE1 and mobile set MT1 must therefore be different. However, it suffices for the destination address of the mobile set MT1 to be known only to the special-purpose terminal device SE1, since connections to the mobile set MT1 are always made via the special-purpose terminal device SE1.

The service and speech signals exchanged between the terminal devices EGx and MT1 can therefore be evaluated in the special-purpose terminal device SE1. Moreover, in a preferred embodiment of the special-purpose terminal device SE1, the speech signals can be mixed with further speech signals, so that it becomes possible to switch conference calls. To that end, the switching unit SWUe is connected with a conference component CONF, so that all the parties of a work team to which the bearer of the mobile set MT1 belongs, for instance, can enter into a conference call. The integrated circuit MUSAC made by Siemens AG can be used as the conference component CONF; it basically has the functions of a signal processor. Such a component makes it possible to arbitrarily mix all the time slots of a plurality of highways under processor control.

In the event that the special-purpose terminal device SE1 is connected to a terminal for central switching stations at the central switching station VSTa, then the call setup between the terminal device EGx and the mobile set MT1 is made by writing the entire telephone number in the destination address field of the SETUP message. In order that the special-purpose terminal device SE1, which among other functions acts as a central switching station, will be included in the call setup as a search for a route is made, its address must be included as a component of the destination address. For instance, if a call to the terminal device EGx is set up from the mobile set MT1 via the base station BS1, the central switching station VSTa and the special-purpose terminal device SE1, then in the mobile set MT1, first the telephone number of the special-purpose terminal device SE1 and then the telephone number of the terminal device EGx are written manually or automatically into the destination address field of the SETUP message. Since the special-purpose terminal device SE1 is acting as a central switching station and not as a terminal device in the network, the connection is switched through by it without changing the telephone number of the terminal device EGx. Nevertheless, the possibilities of listening in or forming a conference call exist in the special-purpose terminal device SE1.

The origination address in the corresponding field of the arriving SETUP message is preferably always checked by the processor MP of the special-purpose terminal device SE1. If the origination address matches the address of the mobile set MT1, then the processor MP ascertains whether instructions from the user are arriving from the mobile set MT1 in the B-channel, for instance by means of the multi-frequency method or via the user-user information (or other transmission channels available). In principle, this enables remote control of the workstation (actuation of electroacoustical tranducers, call recording, callup of recordings, switching of standard conferences, line selection, etc.).

Instead of the decentralized arrangement in the special-purpose terminal devices SE of the processor MP, the switching unit SWUe, and the conference component CONF if one is present, these elements can also be disposed in the server module S. These components (MP, SWUe, CONF) are then available not merely to a single special-purpose terminal device but simultaneously to a plurality of special-purpose terminal devices SE connected to the server module S. Moreover, mutual data access for speech monitoring and for forming conference calls is facilitated thereby.

Figure 2:
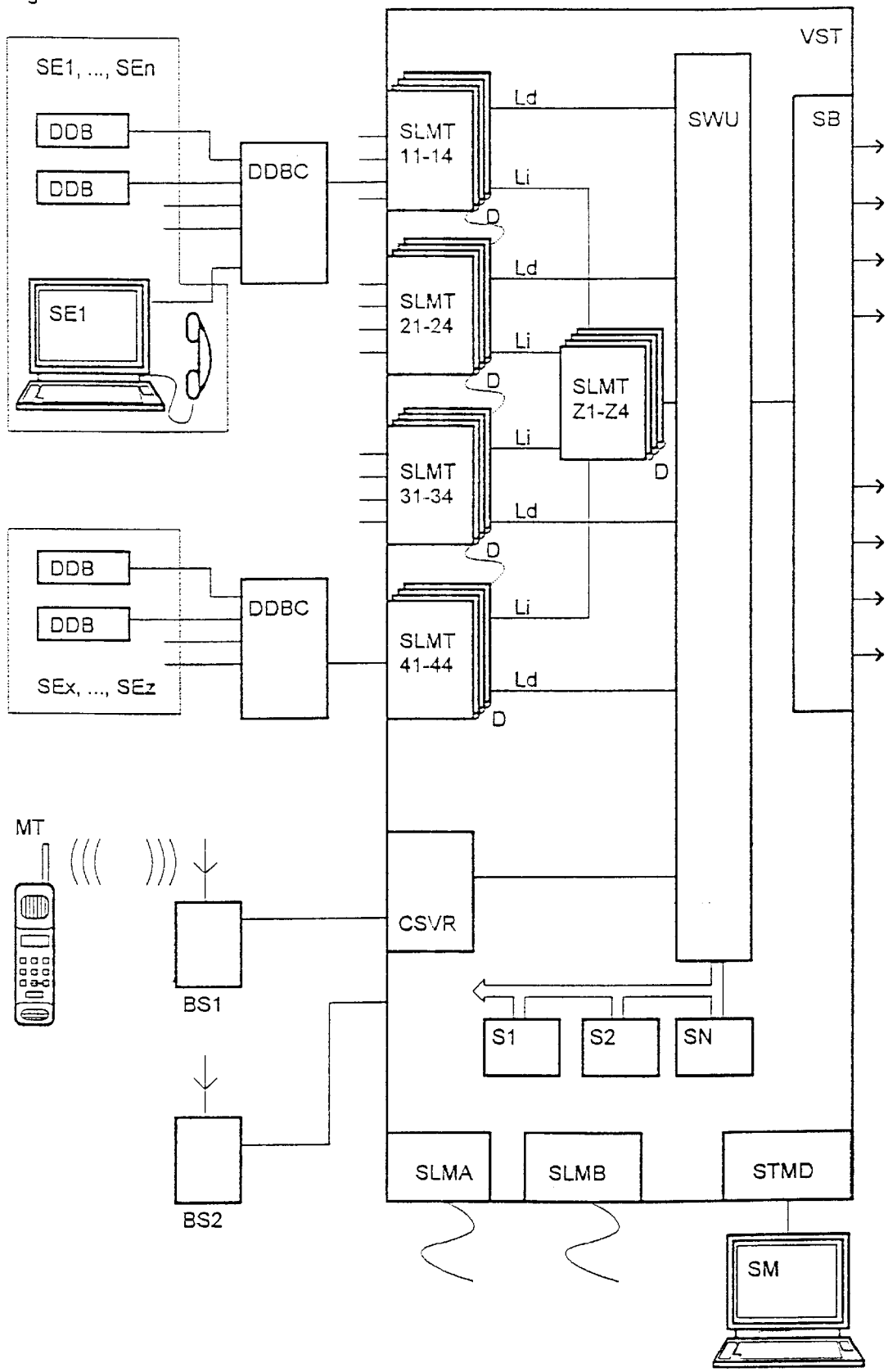
FIG. 2, the communications system of WO-A 92/17013, expanded by the embodiment of the invention.

In FIG. 2, the communications system known from WO-A 92/17013 is shown; it also has a server module CSVR, which is connected to two base stations BS1, BS2. Fundamentally, the communications system comprises a central switching station VST, which is equipped with server modules SLMA, SLMB for conventional terminal devices, with server modules SLMT for special-purpose terminal devices SE, with a server module CSVR for mobile sets MT, with a server module ST for a system manager SM, and with an interface subassembly SB, by way of which additional public or private communications systems are accessible. The special-purpose terminal devices SE1, . . . , SE$n$ connected via concentrator subassemblies DDBC to the central switching station VST are, in the present case, DDB devices (for DIGITAL DEALER BOARD) with keyboards, a plurality of whose keys are programmable in such a way that a desired call setup can be initialized by pressing on a key. Communications systems of this kind, which furnish various special service features that are not generally typical, are used for instance in banks, stock exchanges, or other branches of commerce and trade. One field of application, for instance, is international trading in stocks, currency, or raw materials, which require not only worldwide communications for making decisions but also immediate active intervention into market events. No less significant is the use of these systems in police and fire department dispatching centers or in energy supply system control centers. The squad leader stationed in the central dispatching office is always capable, with the communications system of the invention, of monitoring all communications of officials in the applicable area and of recording them.

A central ingredient of the central switching station VST is a switching unit SWU, in which all the central units used for switching connections through and the requisite central control for this are integrated. The switching unit SWU is also connected to the server modules SLMA, SLMB, STMD and to the interface subassembly SB. The communications system is tied into public communications systems in the appropriate manner for the ISDN system; the interface subassembly SB must assure this tie-in by furnishing special data formats. The switching unit SWU is also connected to integrated servers S1 . . . S$n$ via central bus systems. The server modules SLMA and SLMB connected to the switching unit SWU serve to furnish the well-known functions in communications technology known as BORSCHT functions for conventional analog or digital user terminal devices. The server module STMD carries out adaptations, for instance if configuration changes are necessary, between the communications system and the system manager SM.

The communications servers are embodied as special-purpose peripheral modules, hereinafter called server modules SLMT11, . . . SLMT44; SLMT Z1, . . . , SLMT Z4. They are tied into the communications system in a noncentralized way, being inserted instead of the peripheral modules SLMB. The system-conformal tie-in requires adaptation provisions at the affected hardware and software interfaces, which will be discussed in further detail later. Preferably, where the broker system is at a high degree of expansion or upgrading, the communications servers are arranged in ordered system groups. Preferably, one central system group with four communications servers is associated with four single system groups, each with four communications servers.

In a first expansion phase, for smaller teams of brokers, only a single system group is used, with a plurality of server modules, for instance 4 in number, SLMT11, . . . , SLMT14, which are connected to one another over data routes D and/or a central server module SLMT Z1. In the next expansion stages, additional system groups can be added, each with four server modules SLMT21, . . . , SLMT24; SLMT31, . . . , SLMT34; SLMT41, . . . , SLMT44. These four single system groups can, according to the invention, be linked to one another directly via additional data routes and/or via an additional, central system group with server modules SLMT Z1, . . . , SLMT Z4. Each of the four single system groups is connected to one each of the server modules SLMT Z1, . . . , SLMT Z4 of the central system group via lines Li, and the server modules are connected to one another via data routes D. The maximum number of server modules SLMT per single system group is determined by the capacity of the switching unit SWUs used in the server modules. Of each system group, for instance up to m lines (plus one HDLC signaling line) can be connected to the central system group. Thus a system group has access to m joint lines. The central system group therefore has 4*m terminals, with four terminals intended for HDLC signaling of the single system groups. The remaining (4*m−4) terminals can be used arbitrarily for connections to the single system groups or for joint lines. On the output side, the server modules SLMT11, . . . , SLMT44 are connected, for instance by means of optical wave guides, to the special-purpose terminal devices DDB via concentrator subassemblies DDBC. The concentrator subassemblies DDBC are equipped for that purpose with multiplexing properties, so that the data arriving from a plurality of special-purpose terminal devices DDB can be switched to one connecting line to one of the server modules SLMT11, . . . , SLMT 44. A PCM (pulse code modulation) method is used as the transmission method. Special-purpose terminal devices DDB may be either key-oriented or screen-oriented terminal devices designed for the broker workstation, which have at least one hand set or further electroacoustical transducers that can be turned on. Triggering the special-purpose terminal devices DDB is done via the server modules SLMT, using control procedures BS, BT.

In general, the procedures run on the server modules SLMT are stored organizationally in corresponding complexes in the server modules SLMT. All the software applicable to the server modules SLMT therefore makes a distinction between procedures of the operating system BS the operating technology BT the communications technology VT the security technology ST and the data bank DB.

While the procedures of the operating system BS control the existing system components, the procedures of the operating technology BT take on control tasks in the areas of time synchronization with the other units in the communications system and system reliability.

Malfunction-free operation of each server module SLMT is assured by the security technology ST. In particular, it assures that errors that occur will be analyzed immediately, and that as needed, suitable reactions on the part of the system will be tripped.

The procedures of the communications technology function block VT of the server modules SLMT process the actual service features typical for brokers. Typical broker service features include, for instance:

speech monitoring, stock call holding, parallel calling, conference call, and privacy and tracing functions, which will be discussed in further detail hereinafter. In particular, the procedures of the communications function block VT of the server modules SLMT carry out the conversion of the data formats arriving from the special-purpose terminal devices DDB into the data formats of the communications system.

Also in each of the server modules SLMT is one data bank DB, in which static and dynamic configuration data of the special-purpose terminal devices DDB and server modules SLMT themselves are administered. The static configuration data provide information on how the special-purpose terminal devices DDB are equipped with mobile sets MT, handsets and loudspeakers, while the dynamic configuration data provide information on which of the handsets are busy at the moment and which lines are connected. Via data routes D, the data banks of each server module SLMT are updated with the most recent configuration data. Thus each server module SLMT has a complete picture of the entire configuration of all the server modules SLMT. Any possible change in the configuration status of one of the server modules SLMT or one of the special-purpose terminal devices DDB is imparted immediately to the other server modules SLMT over the data routes D. Combined with this concept is decentralization of both static and dynamic configuration data. This means that when new service features are set up, for instance, any changes can be made without major effort at the server modules SLMT, without requiring central intervention into the procedures of the communications system.

ALso connected to the communications system, via the interface unit STMD, are external memories units with data display—hereinafter called system managers SM—which contain configuration data for the server modules SLMT and the special-purpose terminal devices DDB. The shift of configuration data to external units becomes especially important if the communications system has to be turned off for maintenance word. In that case, when the communications system is started up, the server modules SLMT and the special-purpose terminal devices DDB are located with the configuration data from the system manager SM, thus restoring the original status quickly.

Services features that meets the special requirements for a broker workstation result from this concept. Particularly the "speech monitoring" service feature, by which several calls can for instance be switched to one loudspeaker via a conference component, takes into account the special conditions of a broken workstation.

Active intervention into market events must often be made within seconds. Tedious dialing to establish worldwide links must therefore be avoided under all circumstances. To that end, call setups to destinations can therefore be made by pressing keys of the special-purpose terminal device DDB; by pressing keys, directions can also be specified and the corresponding destination can be reached by suffix dialing. The "stock call hold" service feature by means of which existing connections, such as connections with various international stock exchange stations, are put on "HOLD" at the broker workstation, serve to provide efficient telephoning. This means that the broker at his workstation is "potentially" connected with many partners. Actually, he may have activated one, two or more connections—depending on how many handsets per special-purpose terminal device DDB are available—and can communicate actively with the corresponding partners by way of them. The possibility accordingly exists at any time of putting an actively conducted conversation on "HOLD" and of taking up any conversation that at the moment is on "hold" and actively communicating with that partner. These switchover events are controlled from the special-purpose terminal device DDB by actuating the proper keys or by touching the appropriate field on the screen. The procedures that carry out the control operations are performed by the procedure complexes of the communications technology ST of the server modules SLMT.

It is naturally important not only that the broker team be capable of making rapid contact with the outside, for example making fast calls to an outside stock exchange station, but also that customers be capable of rapidly contacting members of the broker team. Time losses that occur from making multiple calls to various team members that are momentarily absent could be avoided. The customer is therefore given the capability of dialing a number with which he can simultaneously call a plurality of members or a subgroup of the broker team. If this subgroup always has a suitably chosen minimum component of members present, then the customer can very quickly contact the broker team at any time. It may also be necessary for various team members to enter into a conference call with the customer.

Switching of a customer call, one directed to the server module SLMT11, for instance, through to a plurality of team members of different additional system groups can be done (without the collaboration of a central system group) by means of the switching unit SWU of the server module SLMT11, via direct data lines to the appropriate system groups. However, it can easily be appreciated that as the number of additional system groups rises, the demands for capacity of the switching unit SWU of each server module SLMT and the number of connections to be provided rise sharply. Advantageously, a central system group is therefore used that has the server modules SLMT Z1 . . . SLMT Z4. By communications procedures, it is now provided that upon an external call directed to the central system group, a joint connection with a plurality of system groups is set up. The signaling is effected simultaneously to all the appropriate system groups. Speech monitoring, participation of additional parties in the same system group in continuous lines, and the switching of lines are preferably done at the single system group. A joint line can therefore be switched by the central system group to various single system groups. In the single system groups, these joint connections set up by the central system group should preferably be concentrated in a single server module SLMT. From this SLMT, each of the single system groups receives an HDLC signaling path to the central system group. The signaling can be done over this signaling path from or to the central system group, depending on the location of the caller. The acoustical interlinking of a plurality of system groups in the central system group or of individual parties to the conversation in a single system group is done in conference components that are provided in the server module SLMT.

Because of the requirements in the applications fields described above (banks, fire department, police, and so forth), the use according to the invention of mobile phones or mobile sets MT is especially advantageous in conjunction with the communications system shown in FIG. 2. The members of the applicable work team, who can be reached at all times via the mobile sets MT, are capable of at least sometimes using the infrastructure available at the workstation. By means of user-user information, instructions can be sent to the special-purpose terminal devices SE. For instance, a police official can send an emergency call to the central dispatcher or can have the current conversation recorded. The squad leader located at a central station can listen in on the conversations or can set up a conference call connection.

The provisions for achieving the embodiment according to the invention in terms of hardware and software are fundamentally equivalent to those of the communications system of FIG. 1. By using special server modules SLMT for the special-purpose terminal devices SE, these provisions can also be realized within the server modules SLMT. This provides relief for the special-purpose terminal devices SE and enables more economical use of the means employed. A conference component CONF or a switching unit SWU which are disposed in a server module SLMT can in this case be used for a plurality of special-purpose terminal devices SE.

As shown in FIG. 2, the special-purpose terminal devices SE are preferably embodied with computer systems (PCs), expanded as needed with communications modules. An economical PC, which already furnishes essential functions required at a workstation, can be expanded to a high-performance communications terminal device, for instance as explained in International Patent Disclosure WO 94/08430 (Programmable Telecommunication Switch for Personal Computer). The hardware and software provided in the digital dealer board DDB is adapted for the purpose, in a manner available to one skilled in the art, to the interfaces and the operating software of the PC.

We claim:

1. A communications system comprising:
    an ISDN central switching station;
    at least one special terminal device, with electroacoustical transducers, being coupled to the ISDN central switching station via a server module;
    at least one base connection;
    at least one mobile set adapted for connection to the central switching station via the at least one base station and associated base server modules;
    the at least one special terminal device being associated with the at least one mobile set;
    one of the special terminal device and the server module comprising a processor and a switching unit; and
    the processor and the switching unit forming a switchable connection between a terminal device and the at least one mobile set associated with the at least one special terminal device,
    wherein a call setup is enabled from the at least one mobile set to the terminal device via the switching unit by at least one of:
        (a) the at least one special terminal device being adapted for connection to a switching center extension of the central switching station, and a target address of the at least one special terminal device for choosing a route, a target address of the terminal device for a target choice, and an identifier of the at least one mobile set are adapted to be written into a "target address" field of a SETUP message;

(b) the at least one special terminal device being adapted for connection to a user extension of the central switching station, and the at least one mobile set being adapted for inputting a target address of the terminal device into a "user-to-user information" field of a SETUP message, and the at least one special terminal device being adapted for extracting the target address and providing a switchable connection to the target address;

(c) the at least one special terminal device being adapted for connection to a user extension of the central switching station, and the at least one mobile set being adapted for inputting a target address of the terminal device into an ISDN message element "called user number", and the at least one special terminal device being adapted for extracting the target address and providing a switchable connection to the target address; and (d) the at least one special terminal device being adapted for connection to a user extension of the central switching station, and the at least one mobile set being adapted for inputting a target address of the terminal device via a speech channel, and the at least one special terminal device being adapted for extracting the target address of the terminal device and providing a switchable connection to the target address.

2. The communications system of claim 1, the at least one special terminal device comprising at least one of a speech monitoring device and a telephone call recording device for the switched connections.

3. The communications system of claim 1, further comprising a conference component provided in one of the at least one special terminal device and in the server module, the conference component adapted to establish a conference call between the at least one mobile set, the special terminal device, and the terminal device.

4. The communications system of claim 1, the processor being adapted for evaluating at least one of the "user-to-user information" and the "source address" of the corresponding fields of the SETUP message and for carrying out any instructions contained therein.

5. The communications system of claim 1, wherein a call arriving from the terminal device is indicated on the at least one special terminal device and substantially concurrently switchably connected to the at least one mobile set.

6. The communication system of claim 1, wherein a call arriving from the terminal device is indicated on the at least special terminal device and, if the call is not terminated to the at least one special terminal device within a delay period, the at least one special terminal device switchably connects the call to the at least one mobile set.

7. The communications system of claim 1, the at least one special terminal device including an actuating device and an optical display device;

the communications system further comprising:
control procedures that control the actuating device and optical display device and that transfer data in a transfer procedure from the at least one special terminal device and from the server module to a system manager through a system manager server module;

switching procedures that convert transfer formats of special-purpose information data of the at least one special terminal device into communications-specific formats and that perform basic functions of switching technology;

data bank procedures that provide information about the at least one special terminal device and the server module to other server modules via data routes.

8. The communications system of claim 1, the at least one special terminal device being a computer system adapted for use as a communications terminal device.

9. A method for operating a communications system to set up calls from a mobile set to an arbitrary terminal device, the communication system including an ISDN central switching station, at least one special terminal device, with electroacoustical transducers, being coupled to the ISDN central switching station via a server module, at least one base connection, and at least one mobile set adapted for connection to the central switching station via the at least one base station and associated base server modules, the process for setting up calls from the mobile set to the arbitrary terminal device comprising one of:

(a) connecting the at least one special terminal device to a switching center extension of the central switching station;
writing target addresses of the at least one special terminal device for selecting a route and of the arbitrary terminal device for a target choice and the mobile set into a "target address" field of a SETUP message; and
switching, at the at least one special terminal device, the call arriving from the mobile set to the terminal device via a switching unit;

(b) connecting the at least one special terminal device to a user terminal of the central switching station;
writing a target address of the terminal device in the mobile set into "user-to-user information" field of a SETUP message;
extracting the target address with the at least one special terminal device; and
switching the call to the terminal device; and (c) connecting the at least one special terminal device to a user terminal of the central switching station;
forwarding a target address of the terminal device in the mobile set to the at least one special terminal device via a speech channel; and
forwarding the call to the terminal device.

10. The method of claim 9, further comprising:
selectively monitoring the forwarded call in the at least one special terminal device; and
supplying one of speech and data signals of the forwarded call to at least one of the electroacoustical transducer and a recording device.

11. The method of claim 9, further comprising:
forming a conference call between the mobile set, the at least one special terminal device, and the arbitrary terminal device.

12. Process in accordance with 9, further comprising:
forwarding instructions carried out by the processor to the at least one special terminal device over one of a speech channel and a corresponding field of the SETUP message.

* * * * *